Sept. 5, 1944.  M. G. WRIGHT ET AL  2,357,569

GAUGE

Filed June 17, 1942

Inventors
Manfred G. Wright &
Martin W. Gaiser
Attorneys

Patented Sept. 5, 1944

2,357,569

UNITED STATES PATENT OFFICE 2,357,569

GAUGE

Manfred G. Wright and Martin W. Gaiser, Kokomo, Ind., assignors to General Motors Corporation, Detroit, Mich., a corporation of Delaware Application June 17, 1942, Serial No. 447,408

9 Claims. (Cl. 33—147)

This invention relates to measuring means and more specifically to gauging means operating on the fluid flow principle. Gauges have of course been made which operate on the principle of fluid flow to atmosphere between a member which is supplied with any fluid (such as air for example) under pressure and a member to be gauged which is placed in juxtaposition thereto and the space between the two members will determine the amount of fluid escaping and thus the pressure remaining inside the gauging means. This pressure may be read upon a gauge and give an indication of the size of the member. This general type of gauging means is disclosed in the Harrington Patent No. 1,437,053.

However, in order to maintain the readings on the indicating gauge accurate, it is necessary to have at all times a constant head of pressure behind the gauging mechanism so that when articles having the same physical dimensions are applied, the gauge will read the same amounts. It can readily be seen that if the pressure from the supply is altered, even though an article of the same dimensions is applied, the pressure within the chamber will be different and the gauge will read to a different figure. It has therefore been necessary in the past to provide various means for checking this supply fluid pressure at intervals to see if it is maintained the same or to correct for such changes as may occur.

It is an object of our invention to provide a gauging means operating on the fluid flow principle which will not be affected by any alterations or changes in the supply pressure line.

It is a further object of our invention to utilize at the gauging means per se sub-atmospheric pressure or vacuum instead of a higher pressure.

It is a still further object of our invention to provide means for accurately gauging articles by the principle of critical flow of fluids.

With these and other objects in view which will become apparent as the specification proceeds, our invention will be best understood by reference to the following specification and claims and the illustrations in the accompanying drawing, in which:

Figure 1:
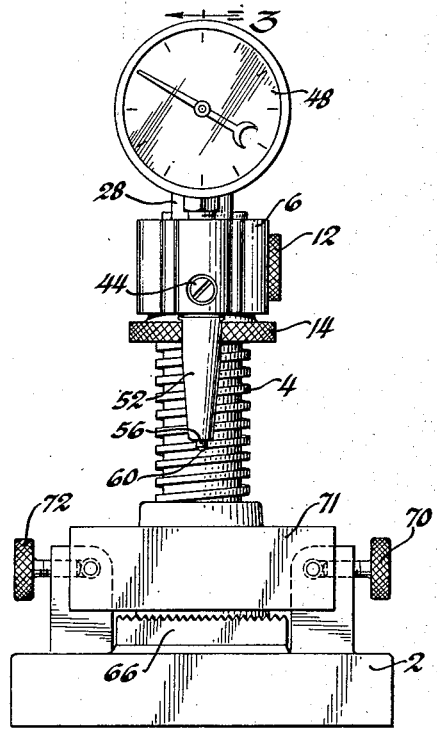
Figure 1 is a front elevation of a gauging means embodying our invention.
Figure 2:
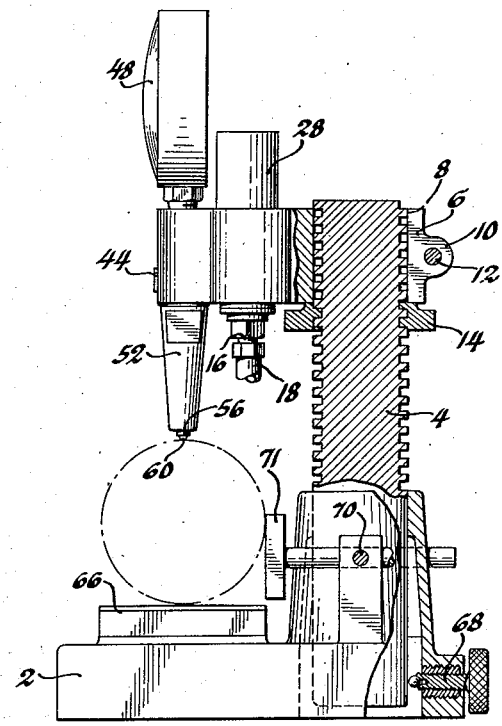
Figure 2 is a side view partly in section of the gauging apparatus.

Referring now more specifically to the drawing, the gauging means is provided with a base member 2 upon which is adjustably supported a threaded vertical shaft 4 which adjustably supports a head 6 through an opening 8 over the threaded shaft 4 and therefore the head 6 may be moved vertically to different predetermined adjusted positions to accommodate various sizes of apparatus or articles to be gauged. The head 6 has a split pair of ears 10 applied to the rear section and through these ears is a horizontal locking screw 12 to clamp the two halves together around the threaded shaft. A lock nut 14 is also provided to be forced up against the lower surface of the head to adjust vertically and complete the locking operation. Thus the head 6 may be moved up or down on the shaft 4 and locked in position by the screw 12 and the lock nut 14.

The head 6 has a vertical opening 9 therethrough on the opposite side from the locking screw 12 and in this opening there is secured a tubular member 16 to which an air supply line 18 is connected. This tubular member 16 terminates in a nozzle having a small opening 20 at the top which is directed toward a second duct or channel 22 directly thereabove. A hollow chamber 24 is formed around the nozzle and between that the head member 26. The channel 22 is located in the head member 26 which is surrounded by a cap 28 having a central escape opening and lined by some sound deadening material such as 30.

Figure 3:
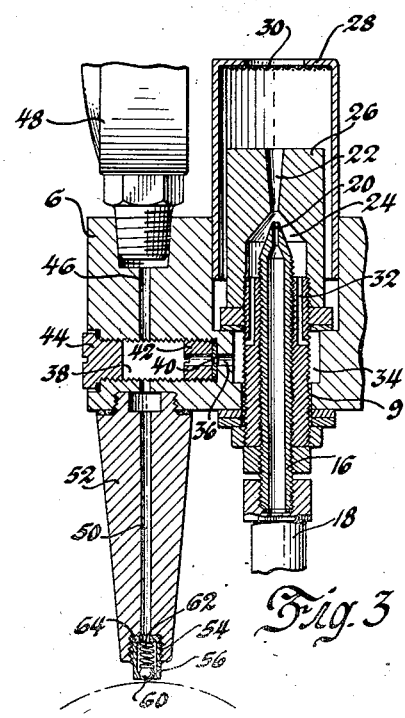
Figure 3 is an enlarged sectional view taken substantially on line 3—3 of Figure 1.
Figure 4:
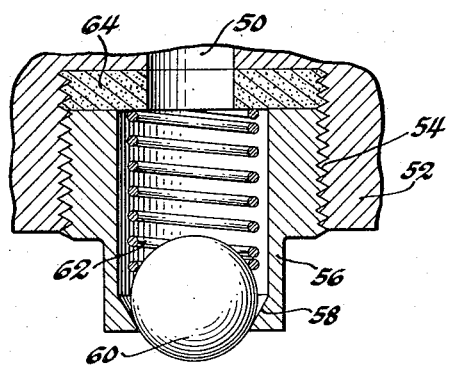
Figure 4 is an enlarged sectional view through the gauging valve.

The hollow portion 24 surrounding the nozzle is connected by a plurality of ducts 32 to a second hollow chamber 34 which in turn has a short duct 36 extending horizontally to the left as shown in Figure 3. This duct terminates in a horizontal opening 38 which is internally threaded and is of larger diameter than the duct 36. At the base of the opening 38 is supported a master orifice 40 of predetermined dimensions and interchangeable, dependent upon apparatus to be tested, which is held in position by a set screw 42 which is hollow and has an opening therein larger than the opening in the master orifice. A plug 44 seals the outer end of the opening 38 and leaves a hollow chamber therein. The central portion or chamber is connected by a duct 46 to an air pressure indicator or vacuum gauge 48 and is also connected by a second relatively long duct or channel 50 extending downwardly through the central portion of a substantially tapered cylindrical member 52 which is attached to the lower portion of the member 6.

This member 52 has an enlarged opening 54 in the lower end into which is screw-threaded a gauging member 56 which is hollow and has a tapered opening 58 in its lower extremity which is adapted to support a ball 60 held in its extended or outward position by a coil spring 62 which presses against the ball and also against a washer 64 which is clamped in position when the member 56 is screwed into place. This ball 60 therefore prevents any air flow in or out of the opening 58 under normal circumstances, but when a piece to be gauged is brought into juxtaposition therewith and forces it upwardly against the spring, will allow air flow, and the change in pressure in the chamber in the center of opening 38 will be indicated on the gauge 48 to gauge the piece.

The base 2 also carries a gauging platform 66 upon which pieces to be measured or gauged may be applied and their proper position determined by various adjustments. Thus, if a circular or spherical object is to be gauged, it is necessary to have the contact between the platform 66 and the ball 60 exactly on a diameter thereof. An adjusting screw 68 is provided which may be turned to change the position of the supporting screw 4 and the head 6 may be adjusted vertically and locked in place by screw 12 and nut 14. The side screws 70 and 72 may be loosened and the stop plate 71 moved back or forward for horizontal alignment purposes, and then 70 and 72 are tightened again to lock it in position.

After the apparatus has been properly adjusted so that the piece to be gauged may be placed in exactly the right position, the device is ready for operation. One of the pieces to be tested is now applied. At this time fluid pressure is being applied to line 18, and as air or other fluid is forced through the restricted nozzle 20 into the channel 22, an ejector is formed and a vacuum is created in the chamber 24 or sub-atmospheric pressure. This vacuum is also applied through the ducts 32 and passage 34 and duct 36 to the master orifice 40, reducing the pressure at the central chamber in opening 38 and maintaining this under reduced pressure. Thus when the ball 60 is raised by a piece to be tested, the air flow may be from the atmosphere past the ball, through duct 50, opening 38, master orifice 40, duct 36, chamber 34, ducts 32, opening 24, duct 22, and to the atmosphere.

The variable orifice formed by the member 56 and the movable ball 60 can be removed if desired and any work piece having an opening therein which it is desired to measure may be inserted in its stead, the opening acting as the orifice. Such a piece might be a carburetor metering jet. It will thus be seen that any opening in a work piece or any dimension of a work piece causing an opening of ball 60 and seat 58 through which fluid may flow can be measured.

This system is designed to operate on the principle of critical flow through an orifice which is that if the absolute pressure on one side of an orifice is always maintained less than .53 of the absolute pressure on the opposite side, the pressure at the throat of the orifice will remain a constant and fixed value of the higher pressure and therefore the flow therethrough will be determined only by the high pressure side. The ratio .53 referred to applies to air only. This principle may be applied using steam, gaseous vapors and other fluids in which case other ratios should be used. In this instance, this means that the flow through master orifice 40 will be determined only by the pressure existing in the central chamber of opening 38 and that any fluctuations in the supply line pressure will in no way affect the accuracy of the gauging device as long as the vacuum pressure is less than .53 of the absolute pressure in the central chamber which ratio is maintained.

The pressure in the central chamber varies, dependent upon the pieces that are being gauged, and this pressure is read upon the gauge 48 to see if the pressures fall within given limits and thus if the pieces are satisfactory, but with this device a constant vacuum supply is provided and any errors due to change of pressure on the supply line are eliminated. Thus the only thing in this system which affects the accuracy of the meter is an alteration in atmospheric pressure which, as is well-known, is relatively small and what alterations there are usually extend over a relatively long time period, such as a day, and in most instances apparatus for measuring atmospheric pressure such as barometers, etc. are available and the apparatus could be checked or adjusted for such atmospheric pressure change once a day.

It is also desired to point out that through this system, it is not necessary to have a vacuum line available, which is usually not found in industrial plants, but it is possible to utilize an ordinary air pressure line, which is readily available. It is thus evident that we have provided an accurate means insensitive to fluctuations in supplied fluid pressure which may be utilized in gauging production members.

We claim:

1. In a gauging device, a housing having a plurality of chambers therein, a pair of orifice means connected to adjacent chambers to form a series system, one of said orifices being of fixed dimensions and the second variable, means to maintain the pressure in the chamber at one side of the fixed orifice below the critical pressure with respect to that in the chamber between the two orifices whereby critical flow may be maintained through the fixed orifice.

2. In a gauging device, a housing having a plurality of interconnected chambers, means to apply vacuum to a chamber at one end of the series, orifice means between the last-mentioned chamber and the next adjacent chamber, variable orifice means at the opposite end of the second chamber opening to the atmosphere and pressure indicating means connected to second chamber to read the pressure therein.

3. In a gauging device, a housing having a chamber therein, a member having a variable opening therein mounted on the housing and connected with the chamber to allow varying amounts of fluid under atmospheric pressure to enter the same, dependent upon the amount which it is open, a member having a fixed opening therein mounted in a connecting duct to the chamber, means to apply vacuum to the side of the fixed opening remote from the chamber and means connected to the chamber to indicate the pressure therein.

4. In a gauging device, a housing having a chamber and a plurality of ducts leading therefrom, variable orifice means connected in one of said ducts, fixed orfice means connected in a second of said ducts, means for applying vacuum to the side of the fixed orifice remote from the chamber and indicating means connected to a third of said ducts.

5. In a gauging device, a pair of orifice members connected in series relation, one being of fixed dimensions and one variable, vacuum means connected to one side of the fixed orifice of sufficient differential pressure to maintain critical flow therethrough, the variable orifice opening to the atmosphere.

6. In a gauging device, a pair of orifice members connected in series relation, one being of fixed dimensions and one variable, vacuum means connected to one side of the fixed orifice of sufficient differential pressure to maintain critical flow therethrough, the variable orifice opening to the atmosphere, and pressure indicating means connected between the two orifices.

7. In a gauging device, a source of fluid pressure, ejector means connected thereto for providing sub-atmospheric pressure, fixed orifice means connected to the ejector and subjected to the sub-atmospheric pressure, variable orifice means connected in series with the fixed orifice means, said sub-atmospheric pressure being sufficiently less than the pressure between the two orifices to maintain critical flow through the fixed orifice.

8. In a gauging device, a source of fluid pressure, ejector means connected thereto for providing sub-atmospheric pressure, fixed orifice means connected to the ejector and subjected to the sub-atmospheric pressure, variable orifice means connected in series with the fixed orifice means, said sub-atmospheric pressure being sufficiently less than the pressure between the two orifices to maintain critical flow through the fixed orifice, and indicating means connected between the two orifice means to indicate the intermediate pressure.

9. In a gauging device, an adjustable mounting, a housing adjustably mounted on said mounting and having a series of chambers therein interconnected with ducts, ejector means in one chamber to supply sub-atmospheric pressure thereto, fixed orifice means in the duct connected to this chamber and to a second chamber, a variable orifice means in a duct connected to said second chamber whose position is determined by means to be gauged and indicating means connected to the second chamber to indicate the pressure therein.

MANFRED G. WRIGHT.
MARTIN W. GAISER.